US006930851B2

(12) United States Patent
Hanson et al.

(10) Patent No.: US 6,930,851 B2
(45) Date of Patent: Aug. 16, 2005

(54) GUIDING A SENSOR USING A BROADLY-CURVED LATERAL PROFILE

(75) Inventors: Reed David Hanson, Chaska, MN (US); John Christopher Morris, Eden Prairie, MN (US); Thomas Christopher Zirps, Minneapolis, MN (US); Nathaniel Boyd Wilson, Edmond, OK (US); Brent Jay Harmer, Johnstown, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 178 days.

(21) Appl. No.: 10/607,568

(22) Filed: Jun. 26, 2003

(65) Prior Publication Data

US 2004/0267494 A1 Dec. 30, 2004

(51) Int. Cl.[7] .............................................. G11B 5/596
(52) U.S. Cl. ...................................... 360/77.04; 700/45
(58) Field of Search ............................... 360/77.04, 75, 360/77.02, 77.07, 77.08; 318/561; 700/28–31, 44, 45

(56) References Cited

U.S. PATENT DOCUMENTS

| | | | |
|---|---|---|---|
| 4,775,903 A | 10/1988 | Knowles | |
| 4,835,633 A | 5/1989 | Edel et al. | |
| 5,136,561 A | 8/1992 | Goker | |
| 5,546,302 A * | 8/1996 | Wang et al. | 700/29 |
| 5,602,689 A | 2/1997 | Kadlec et al. | |
| 5,825,579 A | 10/1998 | Cheung et al. | |
| 5,912,782 A | 6/1999 | Lee et al. | |
| 5,978,752 A | 11/1999 | Morris | |
| 6,046,879 A | 4/2000 | Hampshire | |
| 6,085,147 A | 7/2000 | Myers | |
| 6,101,058 A | 8/2000 | Morris | |
| 6,130,798 A | 10/2000 | Chang et al. | |
| 6,347,018 B1 | 2/2002 | Kadlec et al. | |
| 6,421,198 B1 * | 7/2002 | Lamberts et al. | 360/77.04 |
| 6,459,808 B1 | 10/2002 | Brand | |
| 6,490,121 B1 | 12/2002 | Pruett et al. | |
| 6,549,362 B1 * | 4/2003 | Melrose et al. | 360/77.04 |
| 6,549,364 B1 | 4/2003 | Shih | |
| 6,614,618 B1 | 9/2003 | Sheh et al. | |
| 2002/0036860 A1 | 3/2002 | Bi et al. | |
| 2002/0124132 A1 | 9/2002 | Haines et al. | |
| 2002/0176199 A1 | 11/2002 | Gomez et al. | |
| 2003/0002197 A1 | 1/2003 | Seng et al. | |
| 2004/0228026 A1 * | 11/2004 | Chang et al. | 360/77.04 |

FOREIGN PATENT DOCUMENTS

EP     0774754 A2     5/1997

* cited by examiner

*Primary Examiner*—David Hudspeth
*Assistant Examiner*—James L Habermehl
(74) *Attorney, Agent, or Firm*—David K. Lucente; Derek J. Berger

(57) ABSTRACT

Problems inherent in guiding a sensor via a piecewise-linear lateral parametric profile are generally avoided using at least one broadly curved, generally lateral profile (494). A sensor is configured to move in a nominally longitudinal direction relative to a frame of reference (110). A position scale is defined in a generally lateral direction relative to the longitudinal motion (115). Each broadly curved lateral profile is defined in terms of its corresponding position scale, the scale(s) and the profile(s) both being part of a parametric model that is available for use in guiding the sensor (145).

10 Claims, 6 Drawing Sheets

|       | 783 | 782 | 781 | 780 |
|-------|-----|-----|-----|-----|
| 701 → | 17  | -18 | 6   | 76  |
| 702 → | 48  | -73 | 52  | 73  |
| 703 → | 49  | -86 | 33  | 43  |
| 704 → | 4   | 12  | -16 | -16 |
|       | -11 | 48  | 5   | -40 |
|       | -2  | 16  | -3  | -12 |
|       | ... | ... | ... | ... |
| 796 → | 11  | -25 | 1   | 51  |
| 797 → | 8   | 4   | 2   | 2   |

$$X = \begin{bmatrix} k & \sum_{i=1}^{k} x_i & \sum_{i=1}^{k} x_i^2 & \cdots & \sum_{i=1}^{k} x_i^n \\ \sum_{i=1}^{k} x_i & \sum_{i=1}^{k} x_i^2 & \sum_{i=1}^{k} x_i^3 & \cdots & \sum_{i=1}^{k} x_i^{n+1} \\ \sum_{i=1}^{k} x_i^2 & \sum_{i=1}^{k} x_i^3 & \sum_{i=1}^{k} x_i^4 & \cdots & \sum_{i=1}^{k} x_i^{n+2} \\ \vdots & \vdots & \vdots & \ddots & \vdots \\ \sum_{i=1}^{k} x_i^n & \sum_{i=1}^{k} x_i^{n+1} & \sum_{i=1}^{k} x_i^{n+2} & \cdots & \sum_{i=1}^{k} x_i^{2n} \end{bmatrix}^{-1}$$

US 6,930,851 B2

GUIDING A SENSOR USING A BROADLY-CURVED LATERAL PROFILE

FIELD OF THE INVENTION

This application relates generally to guidance systems, and more particularly to systems in which a significant parametric gradient may exist orthogonal to the sensor's nominal direction of travel.

BACKGROUND OF THE INVENTION

It is difficult to model a critical parameter needed for accurately and efficiently guiding an apparatus along a desired path. One problem is the variety and complexity of the parameters that are needed for effective guidance. Depending on the application, it may be necessary to model elevation, wind velocity, magnetic flux, texture, distortion, or many others. For some guidance systems, it may be necessary to model two or more parameters simultaneously. Some systems have two or more sensors able to measure a parameter real time, while others may have to make several passes with a sensor over a given area to make effective measurements. Some pertinent parameters vary rapidly with time, and some are prone to false measurements.

In practice, it is difficult to avoid the implicit assumption that a parameter of interest will be smoothly-varying, in some sense. For example, suppose that a parameter is measured at a given set of locations, the measurements and their respective locations forming a set of "basis points." For guessing a parameter's value at locations at which measurements were not made, it is common to model the parameter's value as the nearest one of the basis points. This form of modeling is only valid for parameters that are believed to be smoothly-varying.

Consider systems in which one or more sensors move in relation to a frame of reference that the sensor(s) can detect. In most cases, one or more of the necessary resources are limited. Data storage space, computational power, the number of accessible sensors, measurement time, and precision are all limited resources. For guidance systems of this type, it is a shortcoming of prior parametric modeling systems that very few use lateral profiles that are not piecewise-linear. This shortcoming of prior systems causes effective modeling in this context to be unduly wasteful and inaccurate.

SUMMARY OF THE INVENTION

Problems inherent in guiding a sensor via a piecewise-linear lateral profile are generally avoided using a broadly curved lateral profile. By "broadly curved," it is meant that the profile has at least one zone of upward or downward concavity much wider than the sensor. In a first embodiment, a method, a sensor is moved in a nominally longitudinal direction relative to a frame of reference. A position scale is defined in a "generally lateral" direction relative to the longitudinal motion. (Note that "generally lateral" motion need not be perfectly perpendicular to the longitudinal direction.) The broadly curved lateral profile is defined in terms of the generally lateral position scale, the scale(s) and the profile(s) both being part of a parametric model that is used to guide the sensor.

In a first alternative embodiment, a parameter of interest is measured at many (N) positions across the position scale so as to generate at least N measurements. The curved parametric profile is then expressed as a function based on the position scale and fewer than N/2 scalar coefficients, the scalar coefficients at least partially based on the measurements. At a given longitudinal sensor position, a position-indicative value is measured. The model is used to generate a predicted position-indicative value. The two values are compared. A first output value is transmitted if the two values are equal, and otherwise the first output value is generally not transmitted.

In a second alternative embodiment, a parameter of interest is measured at N positions across the position scale so as to express a preliminary profile of many measurements. Each of the measurements has a preliminary measurement error. A servo controller then generates a curved parametric profile value between two successive ones of the N positions, without performing any lateral linear interpolation (i.e. along the generally lateral scale). The model's curved parametric profile is defined so as to attenuate the errors generally and/or to have reduced measurement errors at most of the N positions.

In a third alternative embodiment, the sensor guiding step includes a step of interpolating between the first curved parametric profile and a second curved parametric profile to obtain a longitudinally interpolated value. This step is useful for generating a parameter value at a non-profiled longitudinal position, or for using more than one nearby profile for determining the best estimated parametric value.

In a fourth alternative embodiment, a device of the present invention includes a sensor able to move in a nominally longitudinal direction relative to a predetermined frame of reference. The device further includes a servo controller constructed and arranged to guide the sensor substantially based on a parametric model. The model defines both (1) a generally lateral position scale affixed to the frame of reference and (2) a first curved parametric profile defined relative to the position scale and having two or more contiguous concavity ranges each wider than the sensor.

In a fifth alternative embodiment, the position scale of the model is not merely translational. Depending on the lateral positioning mechanism, the model may be sophisticated so that the "generally lateral" direction accounts for relative rotation or other curvilinear distortion experienced by the sensor. Moreover the parametric model includes many additional parametric profiles distributed across a longitudinal range, the parametric model essentially consisting of a table of coefficients smaller than 1 kilobyte per sensor.

Additional features and benefits will become apparent upon reviewing the following figures and their accompanying detailed description.

BRIEF DESCRIPTION OF THE DRAWINGS

FIG. 7 shows a lateral profile model of the present invention expressed as a 4×97 table, small enough to be stored feasibly in a nonvolatile memory space.

FIG. 8 shows a matrix that is useful for deriving the coefficient values to be inserted into a table like that of FIG. 7.

DETAILED DESCRIPTION

Although the examples below show more than enough detail to allow those skilled in the art to practice the present invention, subject matter regarded as the invention is broader than any single example below. The scope of the present invention is distinctly defined, however, in the claims at the end of this document.

Numerous aspects of basic engineering and of positioning technologies that are not a part of the present invention (or are well known in the art) are omitted for brevity, avoiding needless distractions from the essence of the present invention. For example, this document does not articulate detailed and diverse methods for using a profiled parameter to guide an object in motion. Neither does it include implementation decisions such as how lateral components of force are to be exerted in a particular context. Specific techniques for constructing servo controllers suitable for data storage and transmission are likewise omitted, typically being a matter of design choice to those of ordinary skill in that field of technology.

Definitions and clarifications of certain terms are provided in conjunction with the descriptions below, all consistent with common usage in the art but some described with greater specificity. "Guiding" a sensor means changing a lateral component of force acting on a sensor so as to influence the sensor's motion relative to the frame of reference.

A "range of concavity" is a range within which many successive changes of a variable of interest change monotonically, as measured in regular increments of the generally lateral position scale. "Regular increments" of such a position scale are each wider than the sensor, perhaps by 1–4 orders of magnitude or more.

Figure 1:
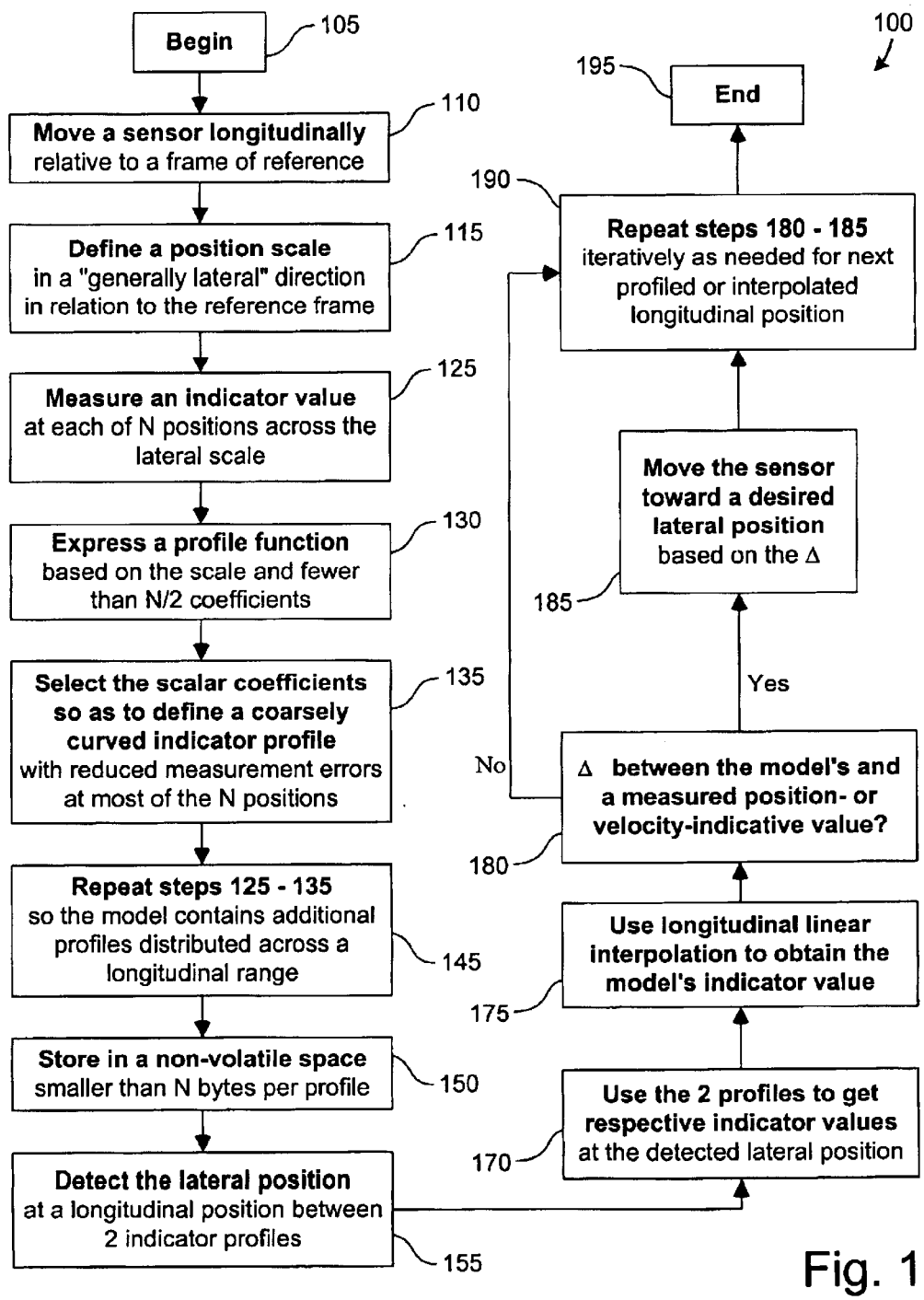
FIG. 1 shows a flowchart of a method embodiment of the present invention.

FIG. 1 shows a method 100 of the present invention comprising steps 105 through 195. A sensor is set in motion relative to a frame of reference 110, defining a nominally "longitudinal" direction of travel. A position scale is defined in a generally lateral direction 115 in fixed relation to the frame of reference, the sensor having a nominal width relative to the scale. Near a longitudinal position to be profiled, a positioning-related indicator value is measured at each of N positions across the position scale 125. This defines a preliminary (partial) profile of many indicator measurements each having a measurement error. A profile function is expressed 130 in terms of the position scale and several (fewer than N/2) scalar coefficients. Scalar coefficients are selected so as to define a "broadly curved" indicator profile and so as to define a model having reduced measurement errors at most of the N positions 135. By "broadly curved" it is meant that the profile has one or more broad ranges of concavity, many times wider than the sensor's nominal width. Steps 125 through 135 are repeated so that the model contains many additional indicator profiles distributed across a longitudinal range 145. The resulting model is stored in a non-volatile memory space smaller than N bytes per profile 150. Note that optional resource-sparing features of the present invention are also appreciable in other contexts, for example, in transmitting part of the model within a bandwidth-limited computer system.

As the sensor continues along its path in a longitudinal position between two of the indicator profiles, the sensor's lateral position is detected 155. The two profiles are used to generate respective indicator values at the detected lateral positions 170. These values are then used to obtain the model's indicator value (e.g. by longitudinal linear interpolation 175) See FIGS. 7&9 and their accompanying discussion below, for an example of how to use more than two profiles for a better-than-linear longitudinal interpolation.

If a difference is detected between the model's value and a value derived from a local measurement 180, a control signal is generated that moves the sensor toward a desired lateral position based on the detected difference 185. (Otherwise a "no change" control signal is generated.) This process of prediction, comparison and correction is repeated 190.

Figure 2:
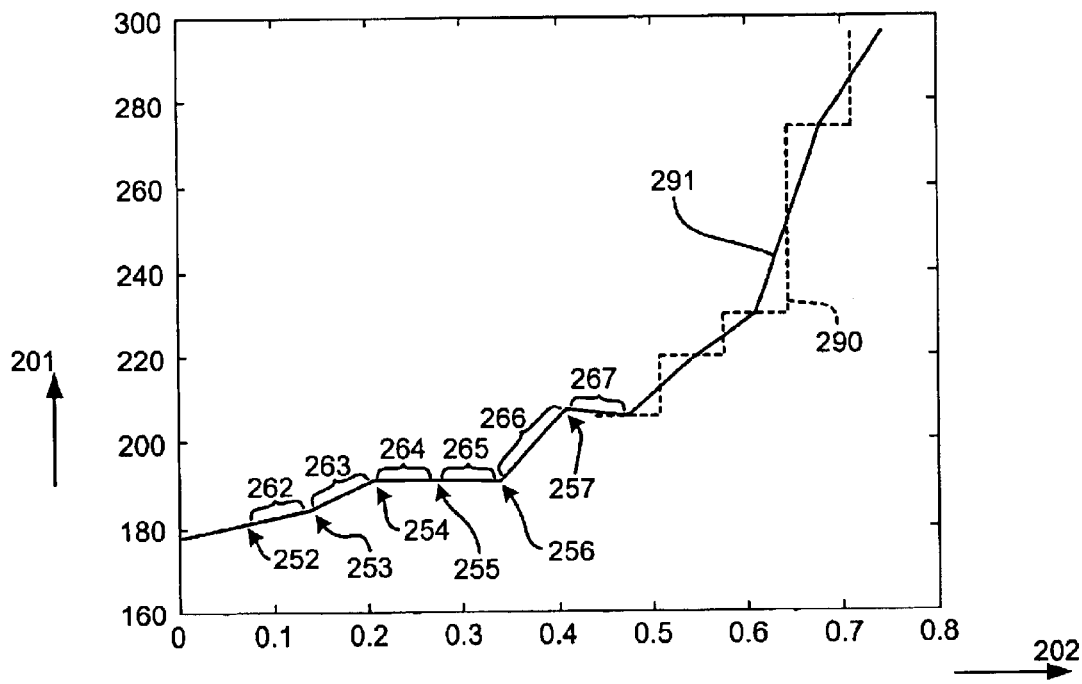
FIG. 2 shows a plot of a parametric profile relative to a generally lateral position scale, introducing concepts but not illustrating the present invention.

FIG. 2 shows parametric profile 290 relative to a generally lateral position scale 202. Scale 202 has units that are proportional to a "track number," a term that basically identifies a lateral (radial) location on a rotary data storage disc surface. For ease of depiction, each track number was "binary normalized" by dividing the track number by $2^N$, where N is the smallest integer such that the total number of tracks on a disc surface does not exceed $2^N$. For binary track numbers, this kind of normalization is simply implemented as a shift of N bits, which is computationally convenient. The model's generally lateral position scale 202 could alternatively be selected in units of milliradians, microns, tracks, meters or similar units generally characterizing a position that is "generally lateral" relative to the sensor's (longitudinal) motion.

The vertical dimension in FIG. 2 is a modeled parameter 201 used in disc drive servo control called "Coherent Repeatable Run-Out (CRRO) Compensation Value." As shown, parameter 201 is an offset value having units of distance about equal to 1/4000 of a "nominal track width." Depending on the application, modeled parameter 201 might instead depict elevation, wind velocity, magnetic flux, or any other generally continuous parameter of interest to motion control, expressed in suitable units. Two profiles 290,291 are shown that model the variation of parameter 201 relative to scale 202. Both are derived from a series of several basis points 252,253,254,255,256,257 derived from measurements. Profile 290 is a simple "zoned" profile in which the parameter value of each point on profile 290 is equal to that of the nearest of the basis points along scale 202. One problem with zoned profiles like 290 is that they often introduce huge errors at lateral positions about halfway between those of each successive pair of basis points.

Profile 291 reduces this problem somewhat by using another piecewise-linear model. Between a successive pair of the basis points 252,253, a linear-interpolation model is used to effectuate a line segment 262 in profile 291. In this way, profile 291 is formed as a series of line segments 263,264,265,266.

Figure 3:
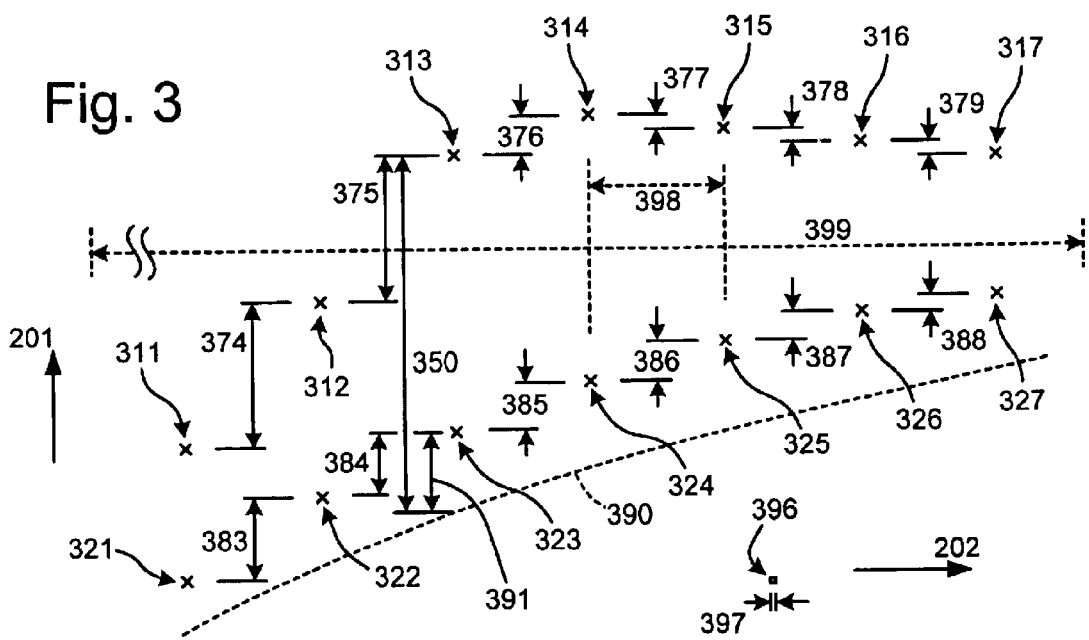
FIG. 3 is a more magnified plot showing how even a finely-graded piecewise-linear model can introduce significant errors into lateral profiles of smoothly-varying parameters.

FIG. 3 shows how other piecewise-linear models can also introduce significant errors into lateral profiles of smoothly-varying parameters. It shows parameter 201 plotted against scale 202 in a greatly magnified area near basis point 257. A "generally lateral position scale" is defined with a regular increment 399 about 2 to 3 orders of magnitude wider than the sensor (e.g., about as wide as a few hundred tracks). Along the top of FIG. 3 are several points 311,312,313 on line segment 266 and several points 314,315,316,317 along line segment 267. Interleaved with these seven successive points 311–317 are six successive offsets 374,375,376,377, 378,379 each corresponding to a successive pair of the basis points 311–317. The abruptness of the transition at point 257 is manifested in that the offsets 374,375 along segment 266 are all substantially equal to each other (i.e. within a rounding error), and that the offsets 377,378,379 along segment 267 are all substantially equal to each other.

Because parameter 201 is considered smoothly-varying, and because point 257 is derived from measurements which can contain measurement error, it will be appreciated by those skilled in the art that abrupt transitions like that at point 257 are likely to contain a significant measurement error. With the present invention, this is alleviated by using a curved model instead. Below each of the points 311–317 is a corresponding point 321,322,323,324,325,326,327 along a smoothly-varying, downwardly-curved profile. Interleaved with these (M) successive points 321–327 are many (M−1) successive offsets 383,384,385,386,387,388. FIG. 3 clearly shows that these offsets change monotonically (e.g. decreasing steadily left to right) across many regular increments 399, so they define a continuous "concavity range" 399 having a width equal to that of many regular increments 398 wide. Along scale 202, each regular increment is 398 is several times wider than the nominal width 397 of the sensor 396. By adopting a curved profile comprising points like 321–327 rather than a piecewise-linear profile comprising points like 311–317, one of ordinary skill will be able to realize a substantial reduction in error. On FIG. 3, that is to say that the actual profile 390 is likely to have a smaller difference 391 (in average magnitude) from curved profile 320 than a difference 350 from a piecewise-linear profile 310 of similar complexity, especially near the places where the piecewise-linear model would have "seams."

Figure 4:
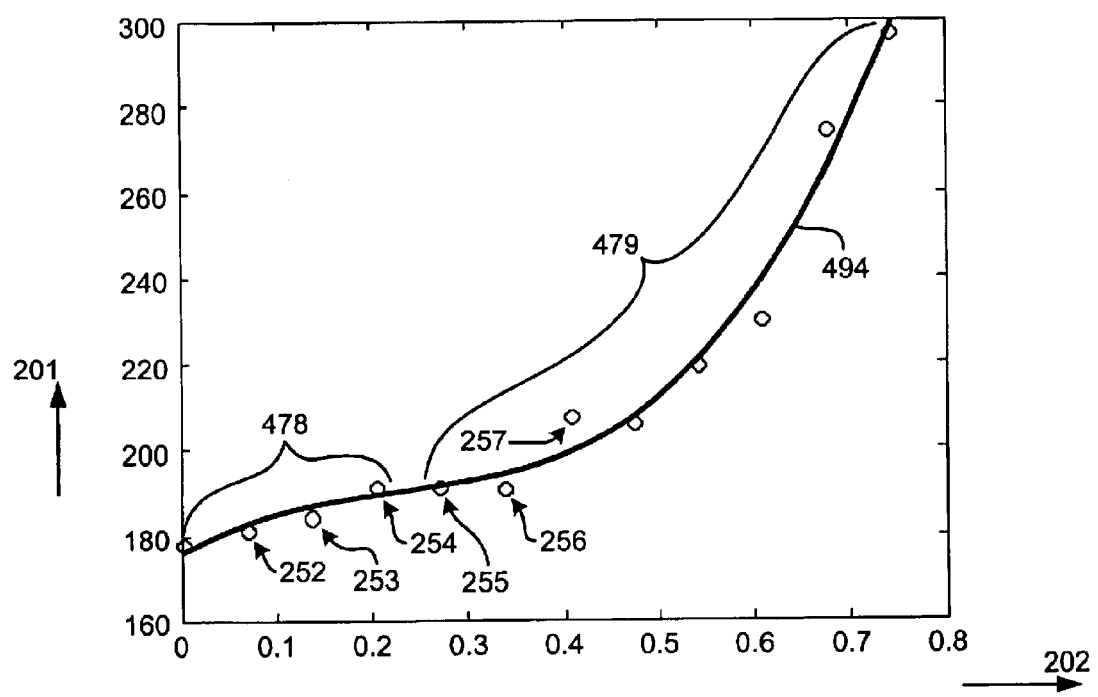
FIG. 4 shows a plot of a profile of the present invention.

FIG. 4 shows a plot of parameter 201 versus scale 202, also showing the several basis points 252,253,254,255,256, 257 of FIG. 2. Overlaid on the plot is a curved profile 494 of the present invention. As shown, profile 494 has an upward concavity range 478 and downward concavity range 479, each contiguous. For efficient storage and manipulation, a profile like 494 is preferably modeled with only 3 to 10 (and more preferably 4 to 7) stored coefficient values uniquely assigned to a particular longitudinal location. These stored coefficient values are then expanded into a complete profile according to a predetermined algorithm. For a given algorithm, such as a third order polynomial characterized in four coefficients, one of ordinary skill will readily be able to select a set of coefficients so as to embody a curved profile (like 494) that passes closely among points (like 252 to 257) derived from nearby measurements.

This embodiment is unusual in several respects. For example, note that the coefficients that characterize each profile are partially based on data from mutually overlapping lateral regions.

Figure 5:
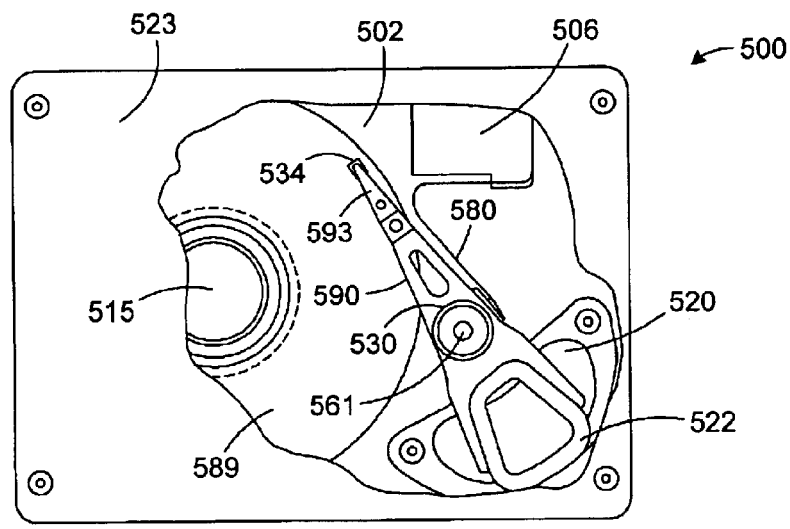
FIG. 5 shows an example of an electromechanical system constructed to benefit from the present invention.

Turning now to FIG. 5, there is shown a "top view" of a system 500 constructed to benefit from the present invention. (Terms like "top view" are arbitrary here, in that data handling systems like 500 can generally operate in any orientation.) System 500 includes "top" cover 523 that cooperates with base 502 to form a sealed chamber. Components supported in the chamber include a spindle motor 515 which rotates one or more data storage disc(s) 589 at hundreds or thousands of revolutions per minute. Information is written to and read from data surfaces on disc(s) 589 through the use of an actuator assembly 561, which rotates during a seek operation about a bearing shaft assembly 530. Actuator assembly 561 includes one or more actuator arms 590 which extend above and below each of the disc(s) 589, with one or more flexures 593 extending from each of the actuator arms. Mounted at the distal end of each of the flexures is a sensor 534 on an air-bearing slider enabling sensor 534 to fly in close proximity adjacent the corresponding surface of an associated disc 589.

Servo and user data travels through sensor 534 and flex cable 580 to control circuitry on controller board 506. (Controller board 506 is configured with circuits described below with reference to FIG. 4 and/or to perform the method described above with reference to FIG. 1). Flex cable 580 maintains an electrical connection by flexing as each sensor 534 seeks along its arcuate path between tracks on disc(s) 589. In this example, the sensor motion is "longitudinal" as it follows a data track. A seek between data tracks is a "lateral" motion, perpendicular to "longitudinal" within abut 20 degrees.

During a seek operation, the overall track position of sensors 534 is controlled through the use of a voice coil motor (VCM), which typically includes a coil 522 fixedly attached to actuator assembly 561, as well as one or more permanent magnets 520 which establish a magnetic field in which coil 522 is immersed. The controlled application of current to coil 522 causes magnetic interaction between permanent magnets 520 and coil 522 so that coil 522 moves. As coil 522 moves, actuator assembly 561 pivots about bearing shaft assembly 530 and sensors 534 are caused to move across the surfaces of the disc(s) 589 between the inner diameter and outer diameter of the disc(s) 589.

Clamping stresses may distort a circular servo track, especially those generated when discs are written before insertion into a system like 500. Additional distortion can occur when the center of the data tracks does not coincide with the disc's axis of rotation. For these and other reasons, a sensor's positional run-out can be repeatable and consistent across many adjacent tracks. This is called "Coherent" Repeatable Run-Out (CRRO). For very fine tracks, it is much better to measure, model, and compensate for CRRO than to completely prevent it.

Figure 6:
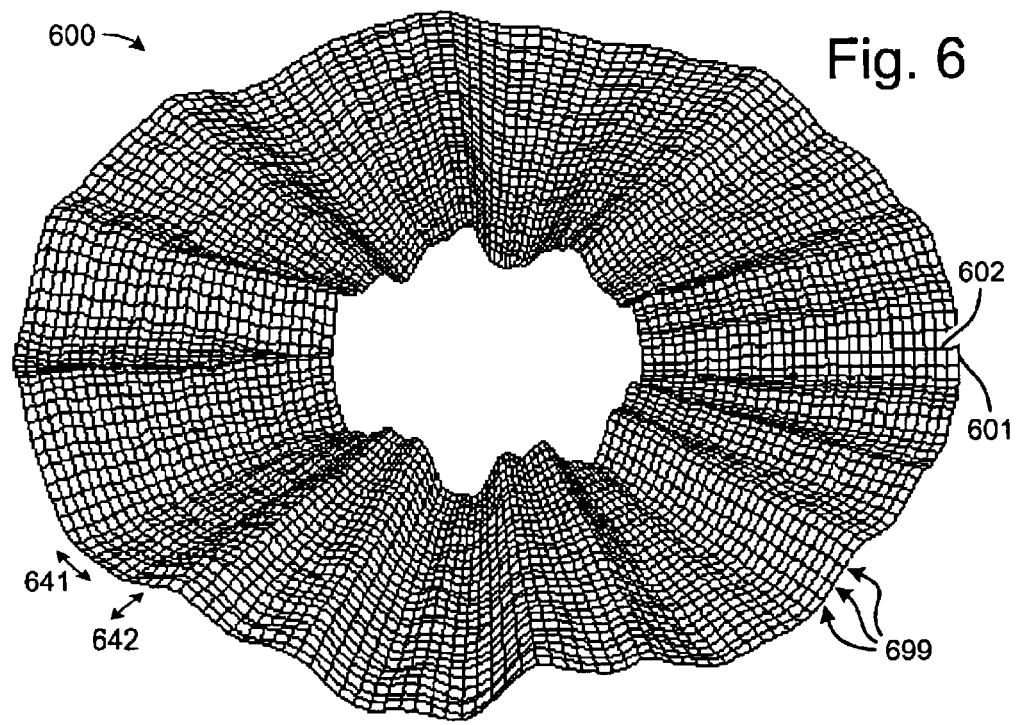
FIG. 6 shows an oblique view of a 3-dimensional plot of thousands of parametric value measurements for a system like that of FIG. 5.

FIG. 6 shows an oblique view of a plot 600 of thousands of CRRO measurements 699 for a system like that of FIG. 5. One plotted measurement 699 is shown at each intersection between a measurement track 601 and a longitudinal position 602 on a given data surface. Relative to the disc's (horizontal) frame of reference moving relative to the sensor (not shown), the longitudinal direction 641 and lateral direction 642 are also shown. Note that the longitudinal positions 602 in plot 600 are perfectly radial and linear, rather than arcuate. Because actuator assembly 561 moves sensor 534 by rotating, however, the controlled "lateral" movement of sensor 534 at a given longitudinal position 602 is actually along an arc. This illustrates how the term "lateral" is used in this document to describe a generally lateral orientation, not necessarily one that is exactly perpendicular to the sensor's nominal direction of travel. What is important for present purposes is selecting a particular lateral scale and defining a curved parametric profile relative to it. The model comprises the selected scale and profile(s) that are used in guiding the sensor's motion relative to a sensed frame of reference (e.g. a grid pattern marked onto a disc surface).

The vertical scale of CRRO measurements is greatly magnified for visibility, so that FIG. 6 somewhat resembles a topographical map of a badly distorted disc surface. Physically, the particular distortions shown indicate localized radial (lateral) position errors primarily due to disc clamping, off-center rotation and/or thermal effects.

Unlike the piecewise-linear interpolations radially connecting plotted measurements 699, FIG. 7 shows a lateral profile model of the present invention. The model is expressed as a table 700 small enough so that it is stored in a nonvolatile memory space of controller board 506. To make this feasible, table 700 stores all of the CRRO data initially needed for guiding one sensor in just 4 columns of 97 rows of one-byte cells. It is a remarkable achievement in present-day disc drive design to compress all of the coherent position error data needed to guide one sensor into 1–2 kilobytes. To store the data for plot 600, for example, 30 columns of 192 rows would ordinarily be required. More generally, lateral profile models of the present invention can be stored, transmitted and used in ways that were previously not feasible.

The first 96 rows 701,702,703,704, . . . ,796 of table 700 each correspond to a longitudinal position (such as 602 of FIG. 6) at which a profile is defined. The profile is a polynomial of the form $$A(x)=c_0+c_1x+\ldots +c_nx^n \tag{1}$$

where n=3 is the order of the polynomial, x is the radial position expressed as a binary normalized track number starting from x=0 at the outermost track, A(x) is the CRRO value in fractional-track units like those of FIG. 2, and the $c_i$'s are coefficients to be extracted from table 700. To obtain each $c_i$, the values in the profile-specific row are each multiplied by a corresponding value in the sensor-specific scaling row 797. The value for co is obtained by multiplying values in column 780, for $c_1$ from column 781, for $c_2$ from column 782, and for $c_{03}$ from column 783. For example the modeled profile at the longitudinal position of row 701 is $$A_{701}(x)=152+12x-72x^2+136x^3 \tag{2}$$

This third order polynomial expresses a modeled profile at a predetermined longitudinal position, sector 0. The scale with respect to which the profile is defined is a binary-normalized track number, just like that of FIG. 4. As x increases from 0.5 to its maximum value at the disc surface's innermost track, $A_{701}(x)$ increases steadily to its maximum value (in the hundreds). This general behavior is like that of FIG. 4 and of many of the radial CRRO profiles of FIG. 6, which reach their respective maxima near the surface's innermost track.

To control servo position effectively, is desirable to compare a just-measured position error against an expected value more than 96 times per disc revolution. In fact, the 96 profiles expressed in table 700 only correspond to a subset of the total number of detectable servo marks on each track of the disc surface. In the system used to generate table 700, for example, each sensor passes 288 servo marks per disc revolution. In fact, table 700 happens to contain a profile for each third servo mark encountered by the sensor.

Suppose that the sensor follows the track for which x=0.5. For this track, the modeled CRRO at sector 0 is $A_{701}(0.5)$= 157. At sector 3, the modeled CRRO is $A_{702}(0.5)$=173. At sector 6, the modeled CRRO is $A_{703}(0.5)$=82. At sector 9, the modeled CRRO is $A_{704}(0.5)$=−32. For sectors between these modeled values, any of several kinds of interpolation can be used. For example, a First Order Hold (FOH) model can be used where longitudinal piecewise linearity is acceptable. Further detail about longitudinal interpolation and modeling is included below with reference to FIG. 9.

FIG. 8 shows a matrix 800 that is useful for deriving the coefficient values to be inserted into a table like that of FIG. 7. The matrix elements are integer powers of the $x_i$'s, reflecting the fact that simple polynomials have been selected for this example. The $x_i$'s represent the generally lateral position scale values of the k basis points that are to be used at a given longitudinal position at which a profile is generated. For the profile of FIG. 4, for example, includes 12 such values ranging between 0 and 0.75. The order of each profile's polynomial is n, which is 3 in the simple example of FIG. 4 but may be in the range of 4 to 7 more typically. Note that the matrix X only needs to be formed and inverted once per sensor in a typical system. The vector of coefficients can be derived as C=XY, where the following $y_i$'s are the basis point parameter values (such those of the 12 basis points 252–257 of parameter 201 shown in FIG. 4).

$$Y = \left[\sum_{i=1}^{k} y_i \sum_{i=1}^{k} x_i y_i \sum_{i=1}^{k} x_i^2 y_i \cdots \sum_{i=1}^{k} x_i^n y_i\right]' \tag{3}$$

Changes can be made to the form of these expressions and to their derivations, but this provides an efficient and concrete example for ease of understanding and implementation. This example represents a least-squares polynomial fit permitting each profile's coefficients to be generated using a single matrix multiply.

Figure 9:
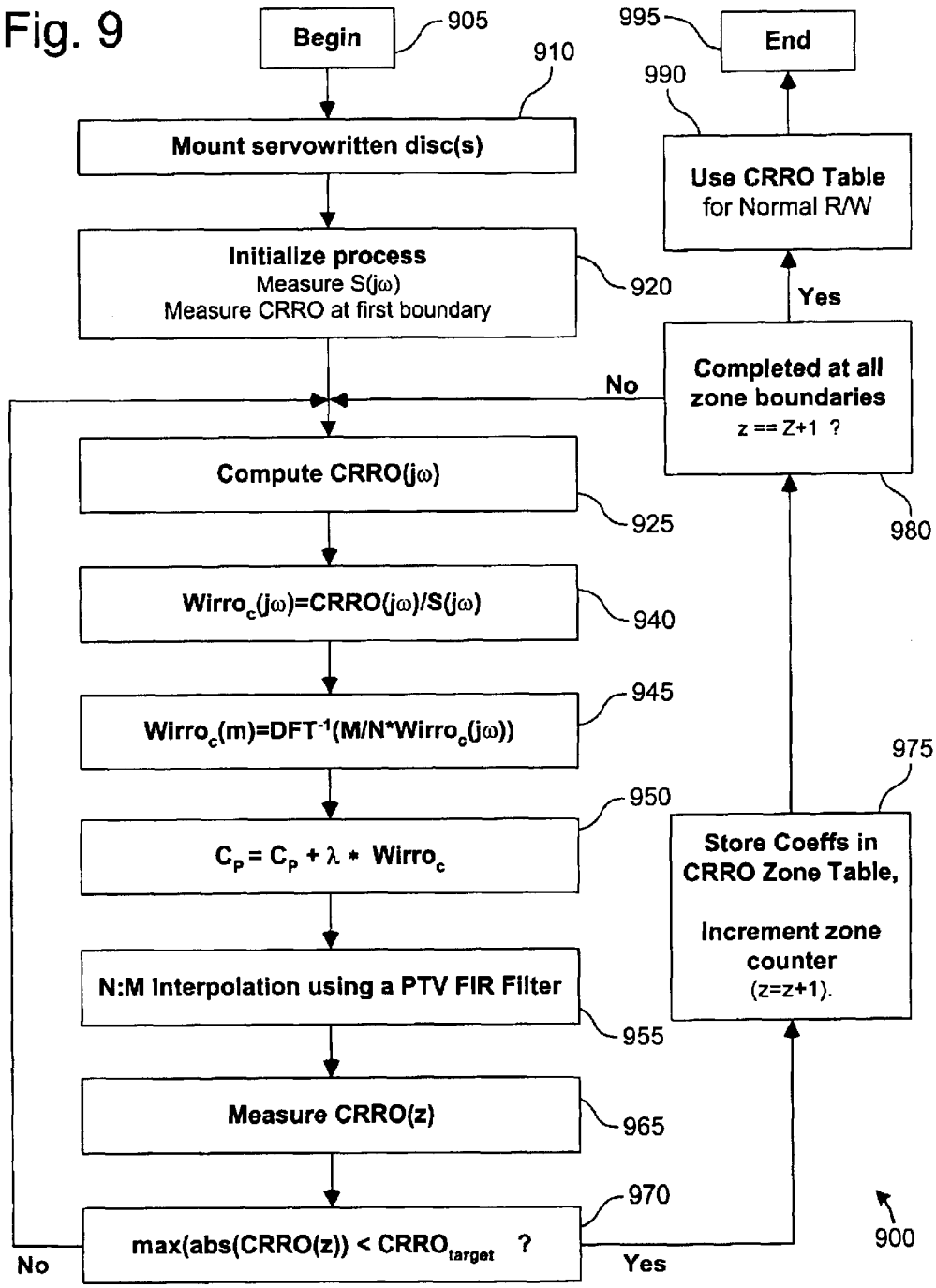
FIG. 9 shows a flowchart of a preferred method of the present invention, one tailored for use in configuring a disc drive.

FIG. 9 shows a method 900 of the present invention comprising steps 905 to 995. One or more servowritten disc(s) are mounted 910 into a disc drive (like 500 of FIG. 5). The process is initialized 920 by positioning a selected sensor at a first zone boundary (i.e. basis position) and gathering Position Error Signal (PES) measurements:

$$PES(i) = \begin{Bmatrix} pes(0) \\ pes(1) \\ \\ pes(N-1) \end{Bmatrix} \tag{4}$$

The sensitivity function S(jω) is computed from position error measurements at J neighboring tracks, and computing CRRO at that location:

$$CRRO = \frac{1}{J}\sum_{j=0}^{J-1} PES(Z_{start}(z)+j) \tag{5}$$

The Discrete Fourier Transform (DFT) of the CRRO is computed 925 over the harmonics of interest as $$CRRO_{j\omega}(k) = \sum_{n=0}^{N-1} CRRO(n)e^{-j(2\pi/N)nk} \tag{6}$$

In the present example, the harmonics of interest are the first 32 integer multiples of the disc rotation frequency, in which most of the CRRO energy resides.
The results are then divided by the sensitivity function to compute $Wirro_c(j\omega)$ 940 over the range of the compensated harmonics, i.e., for $$k \in [h_{min}, h_{min}+1, \ldots, h_{max}] \tag{7}$$

The results are adjusted by M/N and the inverse DFT is computed 945 as $$Wirro_c(m) = \frac{1}{M}\sum_{k=h_{min}}^{h_{max}} \frac{M}{N} Wirro_{j\omega}(k)e^{j(2\pi/M)mk} \tag{8}$$

Note that with $Wirro_c$ computed in this manner, $Wirro_c(m)$ has the same spectral content as the original signal, but is at a lower sample rate. $Wirro_c(m)$ is of length M. In the present example M=3*$h_C$ where $h_C$=32.

In step 950, the model profile $C_P$ is updated with this correction after applying a learning gain of λ. Note that $C_P$ is also of length M. This will be expanded to length N so that it can be written to the model table. The expanded signal is obtained using a N:M FIR Interpolator 955. This is a slower but more accurate alternative to the First Order Hold expansion mentioned above with reference to FIG. 7.

The resulting CRRO is then measured 965, and the AC Feed Forward harmonics are removed from this signal. These are removed by computing the DFT of the CRRO at the harmonics, taking the inverse DFT of this result, and subtracting this signal from the original in the time domain. The maximum absolute value of the resulting signal is then computed and compared to the target CRRO level 970. If the value exceeds a desired target, steps 925 through 970 are repeated. If a FOH interpolation is used in lieu of step 955, piecewise-linearity errors will be introduced. This may be acceptable, though, because the iterative process of steps 925 through 970 will tend to compensate for these errors.

Once the CRRO is driven below the desired target, then the corresponding model profile is stored in the CRRO Zone Table 975. The CRRO Zone Table will have dimensions M by Z for each sensor (M is the period of the resampled signal). In fact, $$CRRO\_Zone\_Table=[P_c(0), P_c(1), \ldots, P_c(Z)]. \quad (9)$$

Here, $P_C(z)$ is an M×1 vector containing the resampled profile for the $z^{th}$ zone. When the model is complete for all of the zone boundaries (i.e. basis positions) 980, it can then be used for guiding the sensor in a normal read/write operation 990.

It is to be understood that even though numerous characteristics and advantages of various embodiments of the invention have been set forth in the foregoing description, together with details of the structure and function of various embodiments of the invention, this disclosure is illustrative only. Changes may be made in detail, especially in matters of structure and arrangement of parts within the principles of the present invention to the full extent indicated by the broad general meaning of the terms in which the appended claims are expressed. For example, the particular elements may vary depending on the particular position monitoring application while maintaining substantially the same functionality. Although the more detailed embodiments described above relate to data handling devices, other applications involving guidance can readily benefit from these teachings without departing from the scope and spirit of the present invention.

Moreover, it will be appreciated by those skilled in the art that the selection of a suitable combination of calibration memory size, accuracy, and formula complexity is a trade-off. The best solution will depend on the application, and except as specified below, no particular solution to this trade-off is of critical importance to the present invention. Moreover a selection of formulae will typically be available and readily derived, depending on the applicable geometry. One of ordinary skill will be able to use the above description to make and use a variety of polynomial- or sinusoid-based or other implementations in light of the teachings above, without undue experimentation.

What is claimed is:

1. A method comprising step of:
   (a) moving a sensor in a nominally longitudinal direction relative to a frame of reference; and
   (b) guiding the sensor substantially based on a parametric model that defines both (1) a generally lateral position scale affixed to the frame of reference and (2) a first curved parametric profile defined relative to the position scale and having a contiguous concavity range wider than the sensor.

2. The method of claim 1 in which the guiding step (b) comprises steps of:
   (b1) using the model to generate a modeled position-indicative value; and
   (b2) transmitting a first output value if the modeled position-indicative value equals a measured position-indicative value, and otherwise generally not transmitting the first output value.

3. The method of claim 1 in which the guiding step (b) comprises steps of:
   (b1) measuring a parameter of interest at many (N) positions across the position scale; and
   (b2) estimating a curved parametric profile value between two successive ones of the N positions without any lateral linear interpolation.

4. The method of claim 1 in which the guiding step (b) comprises steps of:
   (b1) measuring a parameter of interest at many (N) positions across the position scale so as to express a preliminary profile of many measurements each having a preliminary measurement error; and
   (b2) defining the curved parametric profile so as to define a model having reduced measurement errors at most of the N positions.

5. The method of claim 1 in which the guiding step (b) comprises steps of:
   (b1) measuring a parameter of interest at many (N) positions across the position scale so as to generate at least N measurements; and
   (b2) expressing the curved parametric profile as a function based on the position scale and fewer than N/2 scalar coefficients, the scalar coefficients at least partially based on the measurements.

6. The method of claim 1, in which the guiding step (b) includes a step
   (b1) of interpolating between the first curved parametric profile and a second curved parametric profile to obtain a longitudinally interpolated value.

7. A device comprising:
   at least one sensor able to move in a nominally longitudinal direction relative to a predetermined frame of reference; and
   a servo controller constructed and arranged to guide the sensor(s) substantially based on a parametric model that defines both (1) a generally lateral position scale affixed to the frame of reference and (2) a first curved parametric profile defined relative to the position scale and having a contiguous concavity range wider than the sensor(s).

8. The device of claim 7 in which the generally lateral position scale is not merely translational.

9. The device of claim 7 in which the parametric model further includes many additional parametric profiles distributed across a longitudinal range, the parametric model essentially consisting of a table of coefficients smaller than 2 kilobytes for each of the sensor(s).

10. The device of claim 7 in which the parametric model models a lateral position offset, and in which the curved parametric profile includes at least one additional concavity range.

* * * * *